United States Patent
Hattori et al.

(10) Patent No.: US 6,809,494 B1
(45) Date of Patent: Oct. 26, 2004

(54) SERVO CONTROL SYSTEM

(75) Inventors: Kenji Hattori, Tokyo (JP); Koki Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/415,376

(22) PCT Filed: Oct. 27, 2000

(86) PCT No.: PCT/JP00/07567
§ 371 (c)(1),
(2), (4) Date: Apr. 28, 2003

(87) PCT Pub. No.: WO02/37663
PCT Pub. Date: May 10, 2002

(51) Int. Cl.⁷ .............................................. G05B 11/32
(52) U.S. Cl. ...................... 318/625; 318/34; 318/249
(58) Field of Search ................................ 318/625, 249, 318/254, 138, 434, 34; 363/89, 37

(56) References Cited
U.S. PATENT DOCUMENTS 6,429,615 B2 * 8/2002 Schmider et al. .......... 318/254
6,437,997 B1 * 8/2002 Inarida et al. ................ 363/37
6,469,920 B2 * 10/2002 Butler et al. .................. 363/89

FOREIGN PATENT DOCUMENTS

| JP | 8-237994 | 9/1996 |
| JP | 8-289591 | 11/1996 |

* cited by examiner

Primary Examiner—Karen Masih
(74) Attorney, Agent, or Firm—Sughrue Mion, PLLC

(57) ABSTRACT

There are provided a drive unit 50 having a connection part 52 while driving a motor 61, a control unit 40 having a connection part 48 while receiving a command from a host controller 30 and sending a command to the drive unit 50, a rack for providing a back panel 80 having connected parts 84, 85 for removably making electrical connection to the connection parts 48, 52 while accommodating the control unit 40 and the drive unit 50, and a DC voltage conversion part 14 for converting a DC voltage into an output using an AC voltage as an input while being provided in the back panel 80, and the drive unit 50 is provided with a capacitor 58 while being connected to an output of the DC voltage conversion part 14, and an inverter 59 for converting the DC voltage into an AC voltage based on the command.

5 Claims, 9 Drawing Sheets

| | MOTOR CAPACITY (kw) | OUTPUT OF ID PORT | CAPACITANCE |
|---|---|---|---|
| DRIVE UNIT | 0.1 | 0001 | C1 |
| | 0.2 | 0010 | C2 |
| | 0.4 | 0011 | C3 |
| | 0.75 | 0100 | C4 |
| CAPACITOR UNIT | NUMBER | | |
| | n1 | 0101 | C5 |
| | n2 | 0111 | C6 |
| | n3 | 1000 | C7 |

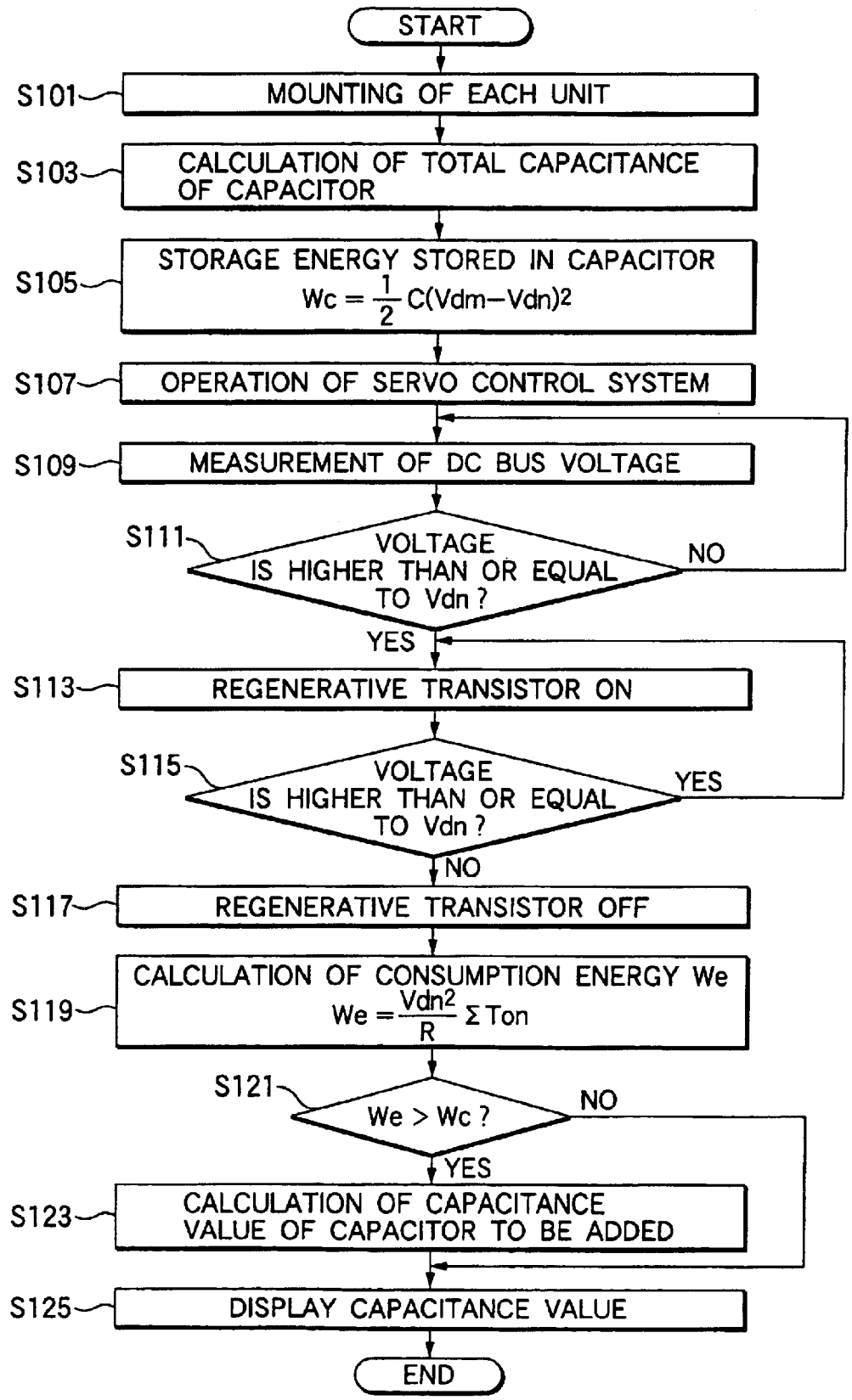

SERVO CONTROL SYSTEM

TECHNICAL FIELD

This invention relates to a servo control system for controlling multiple motors.

BACKGROUND ART

A conventional servo control system will be described by FIGS. 8 and 9 shown in JP-A-8-237994. In FIGS. 8 and 9, in the servo control system, plural servo drivers 2-1 to 2-3 . . . corresponding to plural motors 1-1 to 1-3 . . . , a power source 3, a host controller 4, and a back panel 5 are accommodated in a rack 6.

The servo drivers 2 perform driving control of servo motors etc. and are independent of one another, and connectors (not shown) for connecting the corresponding motors are provided in the front of the servo drivers 2 and connection parts (not shown) for connection to the back panel 5 are provided in the back.

The power source 3 supplies electric power to each the servo driver 2-1 to 2-3 . . . , and the electric power is supplied through a power line 5a provided in the back panel 5.

The host controller 4 performs control of the whole apparatus and is connected to each the servo driver 2-1 to 2-3 . . . through a line 5b for LAN provided in the back panel 5.

The back panel 5 makes connections mutually among each the servo driver 2-1 to 2-3 . . . , the power source 3 and the host controller 4, and the power line 5a and the line 5b for LAN used mutually are provided. Plural connection parts 5c connected to the connection parts (not shown) provided in the back of the servo drivers 2 are provided in the back panel 5.

The rack 6 accommodates the servo drivers 2, the power source 3, the host controller 4 and the back panel 5, and a radiating fin 7 is provided in the bottom of the rack 6 and the back panel 5 is provided in the rear of the inside of the rack 6, and the connection parts (not shown) of the servo drivers 2 are coupled to the connection parts 5c of the back panel 5 by inserting the servo drivers 2 into the rack 6 from the front.

Since the servo control system is constructed as described above, crossover wiring among the servo drivers 2-1 to 2-3 . . . can be omitted by providing the power line 5a common to each the servo driver 2-1 to 2-3 . . . in the back panel 5.

Also, since each the servo driver 2-1 to 2-3 . . . is connected to the host controller 4 by the line 5b for LAN provided in the back panel 5, wiring by one servo driver becomes unnecessary.

By the way, the servo control system constructed as described above does not make reference to a technique of processing regenerative electric power from the motors 1-1 to 1-3 . . . . As such regenerative electric power processing, for example, as described in JP-A-8-289591 (see FIG. 6), in the case that a configuration for forming an output of a power source 3 into DC and connecting a capacitor to said output is adopted, when motors 1-1 to 1-3 . . . . become a regenerative state, regenerative electric power is generated from the motors 1-1 to 1-3 . . . and the regenerative electric power is stored in the capacitor through servo drivers 1-1 to 1-3 . . . .

However, since said capacitor is placed intensively, all the regenerative energy cannot be stored in the capacitor in addition of the motors 1 with an increase in the number of control shafts, change in rated capacity of the motor 1-1 etc. with an increase in a load, use with high regenerative frequency. Thus, the regenerative energy incapable of being stored is consumed by a regenerative resistor, but it is not desirable from the viewpoint of effective use of the energy.

On the other hand, in the case that a capacitor capacity is determined assuming usage in which regenerative energy is large with respect to all the motors 1-1 to 1-3 . . . , there was a problem that there is too room in a capacitance of a capacitor and the capacitor becomes large-scale more than necessary when the number of control shafts of the motors 1-1 to 1-3 . . . decreases or regenerative electric power generated from the motors 1-1 to 1-3 . . . is small.

On the contrary, when an inverter for regeneration for regenerating the regenerative electric power to an AC power source is used, there was a problem that the servo control system becomes complicated and large-scale.

DISCLOSURE OF THE INVENTION

This invention is implemented to solve the problems, and an object of the invention is to provide a servo control system capable of flexibly adjusting a capacitance of a capacitor connected to a DC bus according to the number of motors, motor use conditions and so on.

A servo control system according to the invention has a plurality of motors for driving a plurality of controlled targets, a plurality of drive units having a first connection part, for driving the motors, a control unit having a second connection part, for receiving a command from a host controller and sending a command to the drive unit, a rack including a back panel having a connected part for removably electrically connecting to the first and second connection parts, the rack accommodating the control unit and the drive unit, and a DC voltage conversion part for converting an AC voltage as an input into a DC voltage as an output, the DC voltage conversion part disposed in the back panel, in which the drive unit has a capacitor having a predetermined capacitance value determined based on a rated capacity of the motor driven by the drive unit and connected in parallel with an output of the DC voltage conversion part and an inverter part for converting a DC voltage into an AC voltage based on a command and the capacitor has a capacitance value in which an allowable ripple current is larger than a ripple current flowing through the capacitor at a time of a rated load of the motor and electric power is supplied to the motor with respect to an instantaneous power failure of predetermined time of the AC voltage.

The servo control system according to another aspect of the invention, has a capacitor unit having an add-on capacitor connected in parallel with the capacitor and having a third connection part removably electrically connected to the connected part of the back panel.

A servo control system according still another aspect of the invention, has a plurality of motors for driving a plurality of controlled targets, a drive unit having a first connection part, for driving the motors, a control unit having a second connection part, for receiving a command from a host controller sending a command to the drive unit, rack including a back panel having a-connected part for removable electrically connecting to the first and second connection parts, the rack accommodating the control unit and the dive unit, a DC voltage conversion part for converting an AC voltage as an input into a DC voltage as an output, the DC voltage conversion part disposed voltage detection means for generating a signal when a DC voltage value of the DC voltage conversion part reaches a predetermined value, switching means connected to an output of the DC voltage conversion part through a resistor, the switching means for performing on-off control based on the presence or absence of a signal from the voltage detection means, first calculation means for calculating consumption energy consumed in the resistor based on the on time of the switching means and the DC voltage value, second calculation means for calculating storage energy stored in the capacitor and the add-on capacitor based on a predetermined voltage rise value of the DC voltage of the DC voltage conversion part and a capacitance value of the total sum of the capacitor and the add-on capacitor and for comparing a value of the consumption energy with a value of the storage energy, and display means for displaying a result of the comparison means in which the drive unit has a capacitor having a predetermined capacitance value determined based on a rated capacity of the motor driven by the drive unit and connected in parallel with an output of the DC voltage conversion part and in inverter part for converting a DC voltage into an AC voltage based on a command.

The servo control system according to further another aspect of the invention, has a capacitor unit having an add-on capacitor connected in parallel with the capacitor and having a third connection part removably electrically connected to the connected part of the back panel, third calculation means, calculating storage energy stored in the capacitor and the add-on capacitor based on a predetermined voltage rise value of the DC voltage of the DC voltage conversion part and a capacitance value of the total sum of the capacitor and the add-on capacitor and for comparing a value of the consumption energy with a value of the storage energy, in place of the second calculation means, and display means for displaying the capacitance value.

The servo control system according to still another aspect of the invention, has identification number generation means for detecting that the first connection part of the drive unit and the third connection part of the capacitor unit are electrically connected to the connected part and for generating identification numbers associated with capacitance values of the capacitors provided in the drive unit and the capacitor unit, detection means for detecting an identification number of the identification number generation means, fourth calculation means calculating the total sum of capacitance values of the capacitor and the add-on capacitor from the identification number of the detection means and for calculating the storage energy value running short and calculating a capacitance value of a capacitor to be added when the consumption energy value obtained by the first calculation means is higher, and display means for displaying the capacitance value.

BRIEF DESCRIPTION OF THE DRAWINGS

FIG. 7 is a flowchart showing a procedure for determining a capacitance value of a capacitor to be added.

BEST MODE FOR CARRYING OUT THE INVENTION

Embodiment 1

Figure 1:
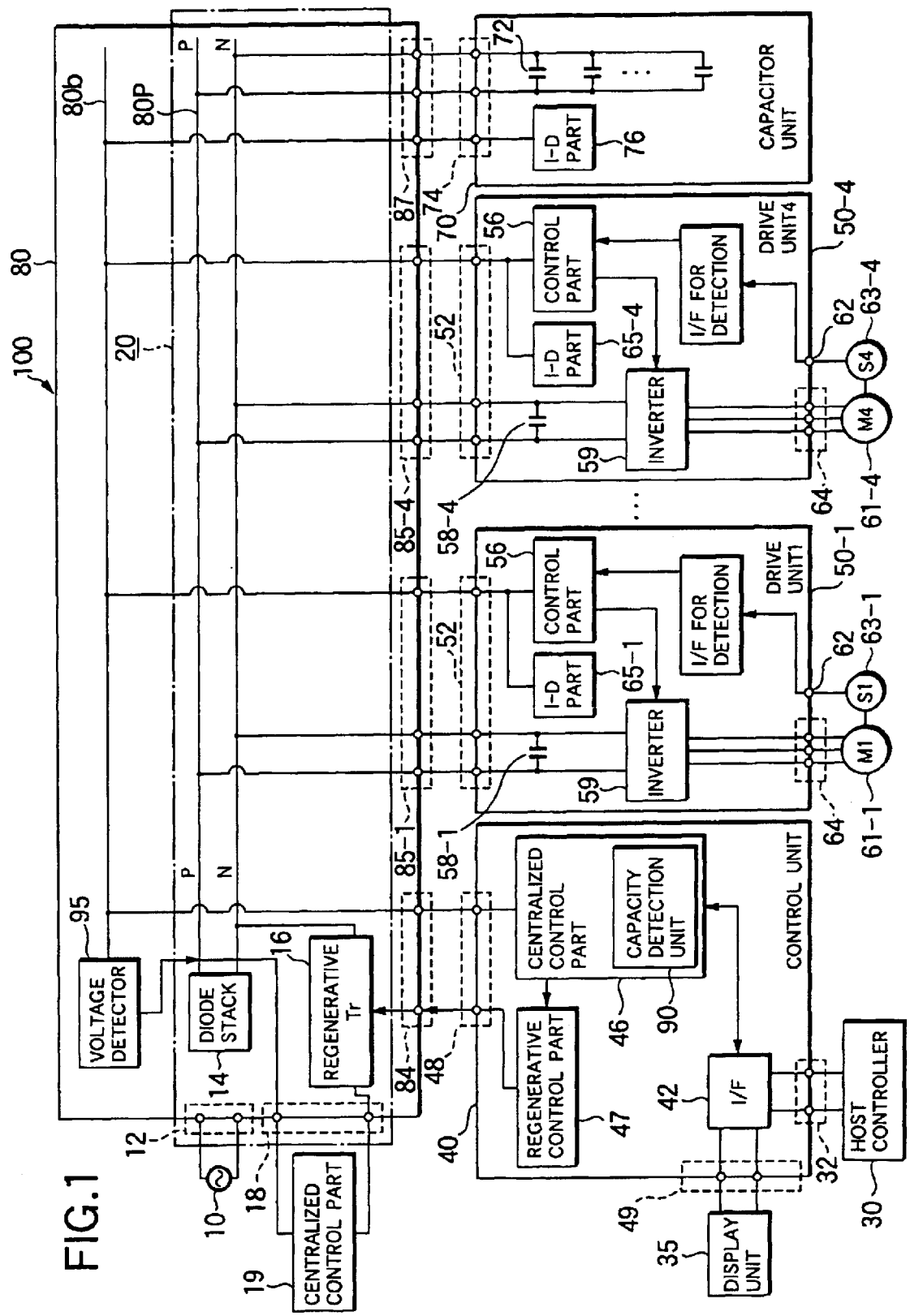
FIG. 1 is the whole connection diagram of a servo control system showing one embodiment of this invention.
Figure 3:
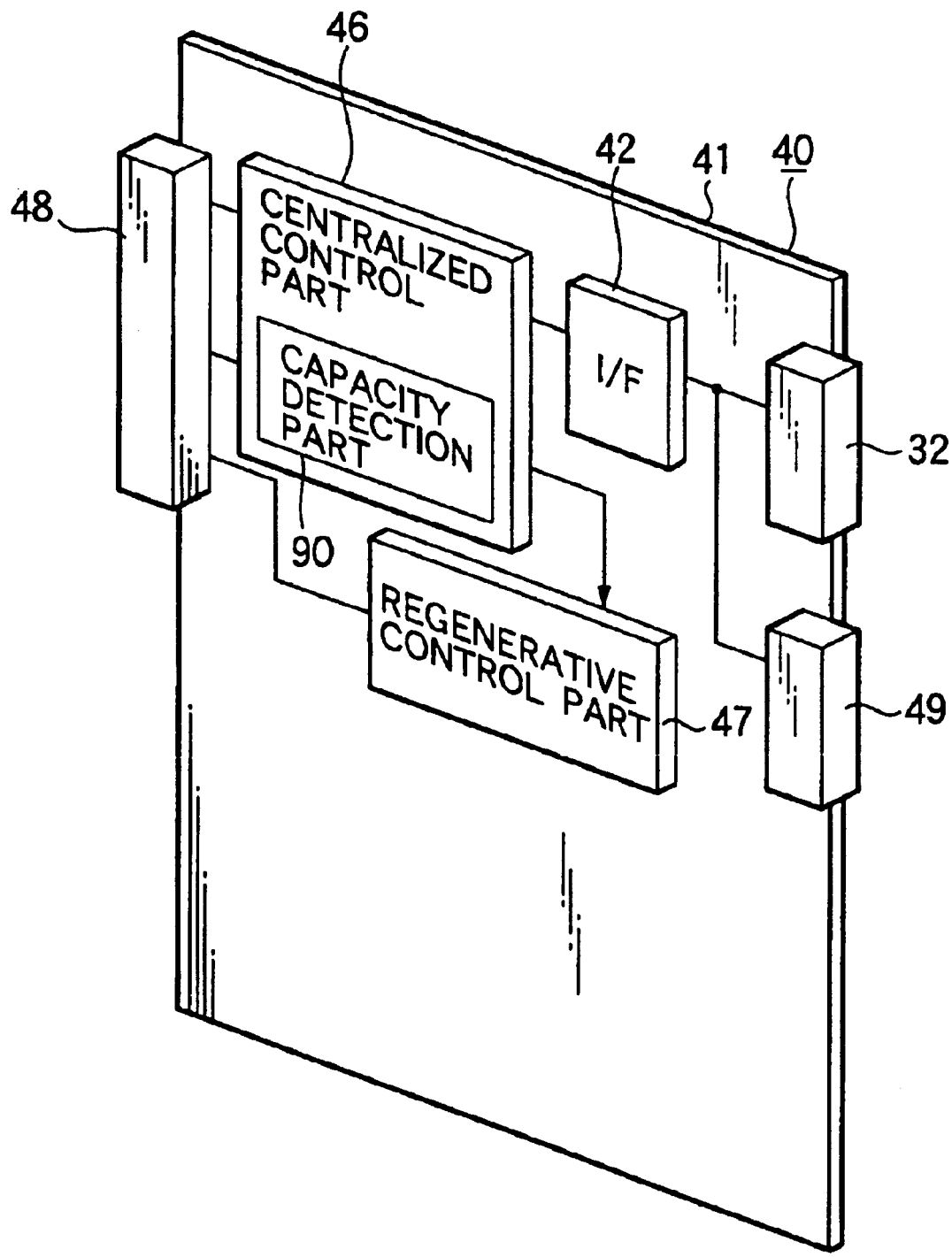
FIG. 3 is a perspective view of a control unit shown in FIG. 1.
Figure 4:
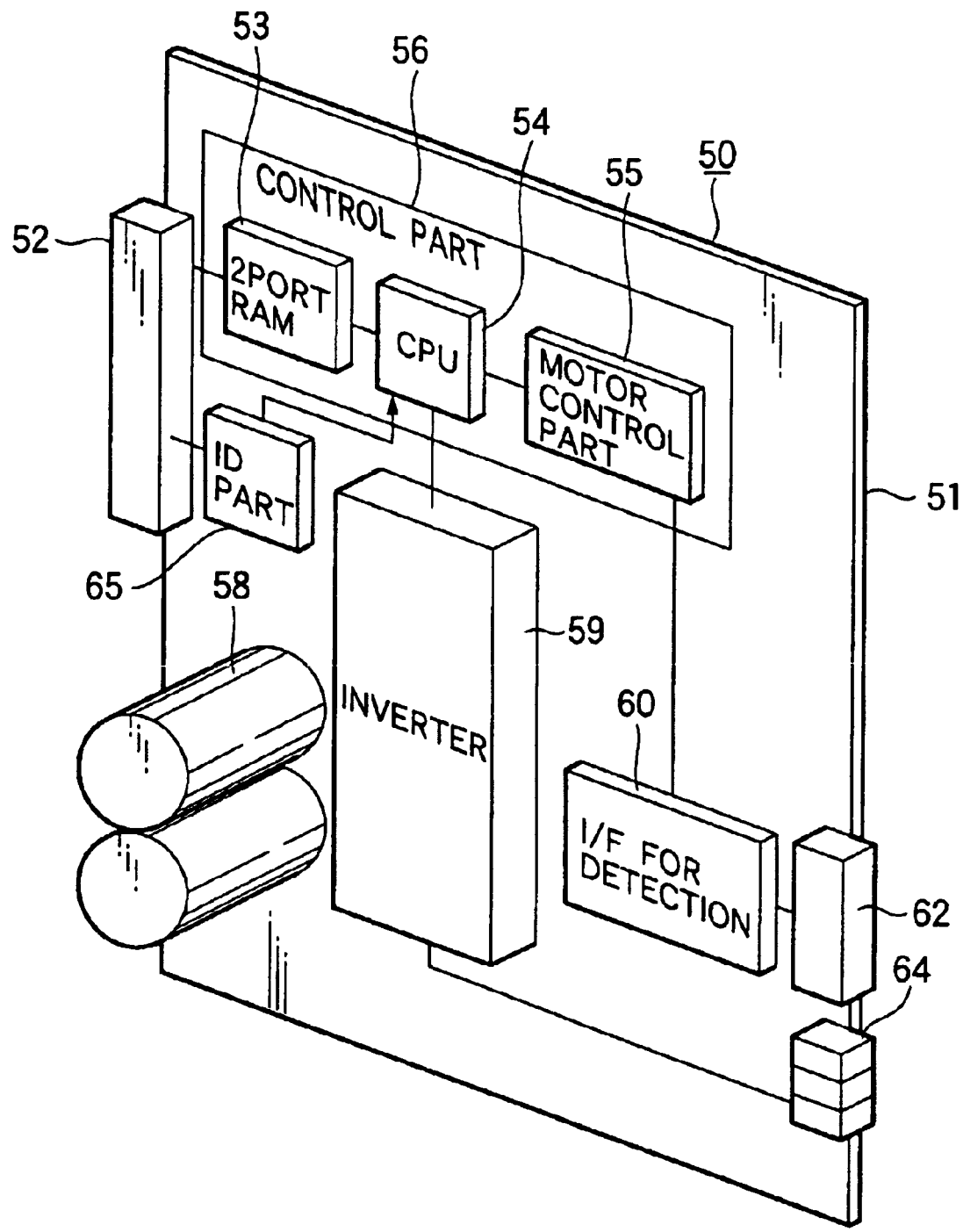
FIG. 4 is a perspective view of a drive unit shown in FIG. 1.
Figure 5:
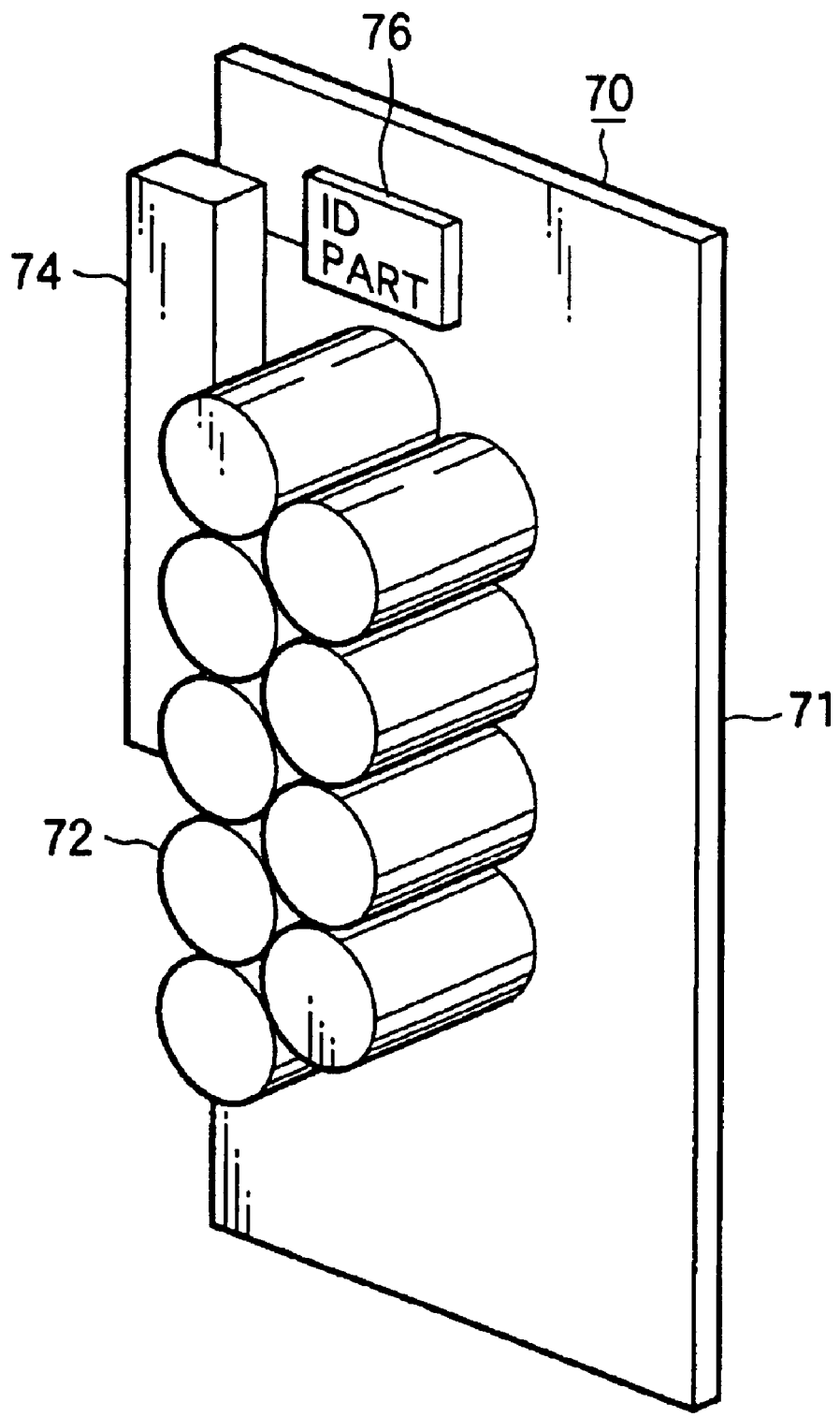
FIG. 5 is a perspective view of a capacitor unit shown in FIG. 1.

An embodiment of this invention will be described with reference to FIGS. 1 to 5. FIG. 1 is the whole connection diagram of a servo control system according to one embodiment of this invention, and FIG. 2 is a perspective view of a back panel of the servo control system shown in FIG. 1, and FIG. 3 is a perspective view of a control unit, and FIG. 4 is a perspective view of a drive unit, and FIG. 5 is a perspective view of a capacitor unit.

In FIGS. 1 to 5, a servo control system 100 has a power source part 20 for converting an AC power source 10 into a DC power source, a control unit 40 which generates a control command etc. based on a command of a host controller 30 and also is connected to an display unit 35 acting as displaying means, a plurality of drive units 50-1 to 50-4 for driving motors 61-1 to 61-4 based on a command from the control unit 40 and also detecting an angle of rotation by detectors 63-1 to 63-4 to perform feedback control, a capacitor unit 70 for storing regenerative electric power generated from the motors 61-1 to 61-4, a back panel 80 which forms wiring of signals among the host controller 30, the drive units 50-1 to 50-4 and the capacitor unit 70, and the power source, etc. and also is connected to the AC power source 10 and a regenerative resistor 19, and a voltage detector 95 acting as voltage detection means for detecting a voltage of DC buses P, N of the power source part 20.

Figure 2:
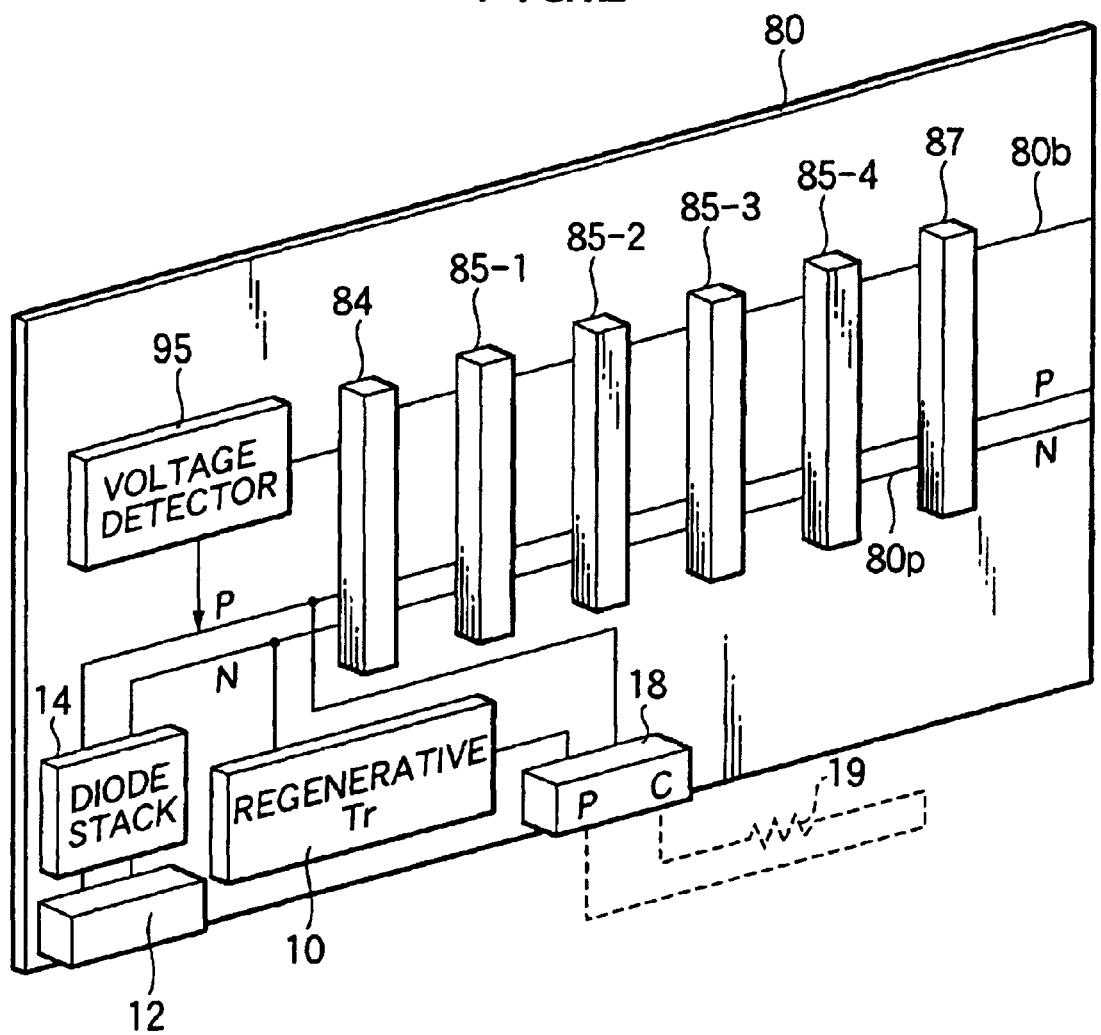
FIG. 2 is a perspective view of a back panel shown in FIG. 1.

As shown in FIGS. 1 and 2, the power source part 20 is provided with a power source terminal 12 fixed in the back panel 80 while being connected to the AC power source 10, a diode stack 14 acting as a DC voltage conversion part fixed in the back panel 80 while converting the AC power source 10 into a DC power source, a regenerative transistor 16 acting as switching means fixed in the back panel 80 while connecting the side of a collector to the DC bus N, and a resistance terminal 18 fixed in the back panel 80 while connecting one of the resistance terminal to the side of an emitter of the regenerative transistor 16 and connecting the other of the resistance terminal to the DC bus P, and the regenerative resistor 19 is connected to the resistance terminal 18.

Here, the regenerative resistor 19 may not be connected as described below depending on size of regenerative energy etc. of a load driven by the motors 61-1 to 61-4.

As shown in FIG. 2, the back panel 80 is stood and provided in a rack (not shown), and the power source terminal 12, the diode stack 14, the regenerative transistor 16, the resistance terminal 18, and six connectors 84, 85-1 to 85-4, 87 acting as a connected part for removably connecting plural units are mounted in the back panel 80, and a bus pattern 80b such as an address bus and a power pattern 80p for forming the DC buses P, N are wired among each the connector 84, 85-1 to 85-4, 87.

The control unit 40 has a function etc. of communication with the drive units 50 and the host controller 30, and as shown in FIG. 3, the control unit 40 is provided with a printed board 41, and a connector 32 for command acting as a first connection part capable of removably making electrical connection to the host controller 30, an interface (hereinafter called I/F) 42, a centralized control part 46 having a well-known CPU etc., a regenerative control part 47 for performing on-off control of the regenerative transistor 19, a connector 48 for back panel wired to the centralized control part 46 and the regenerative control part 47, and a connector 49 for display connected to the display unit 35 while being wired to the I/F 42 are fixed in the printed board 41, respectively.

The drive unit 50 drives and controls the motor 52 based on a command signal from the control unit 40, and has a kind according to a rated capacity of the motor 52 since a capacitance of a capacitor 58 varies depending on the rated capacity of the motor 52.

Figures 6A, 6B:
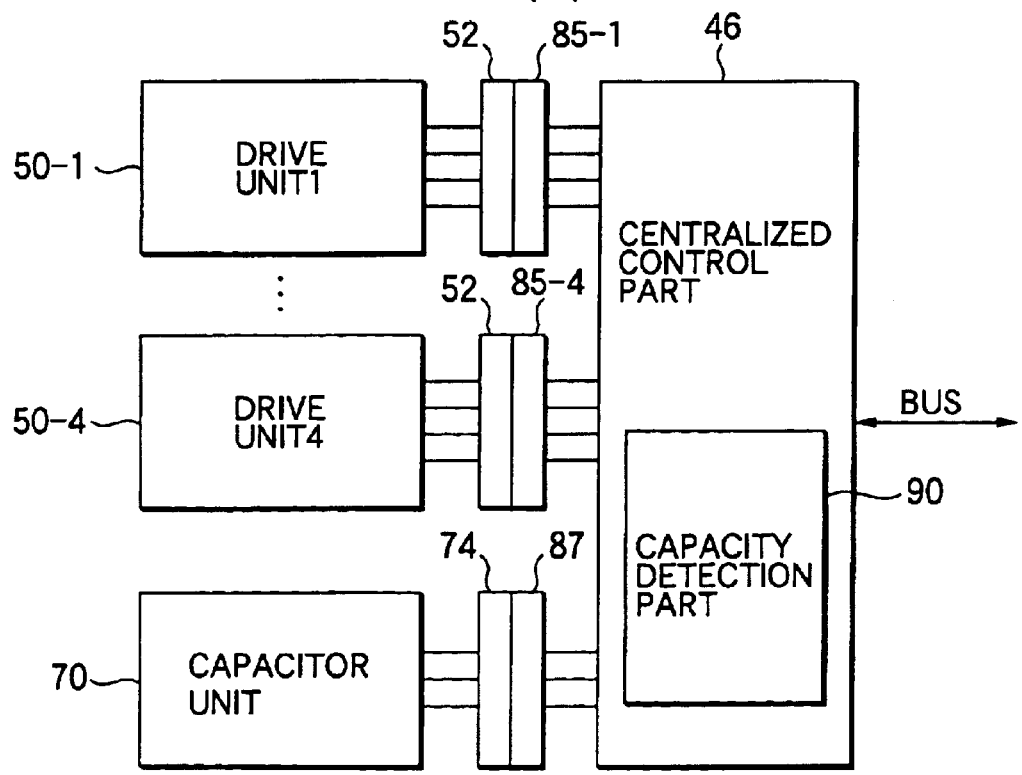
FIG. 6 is a table (a) showing a generation signal of an ID part corresponding to a motor capacity and a capacitance value of a capacitor, and is a connection diagram showing connections between drive units and ID parts.
Figure 8:
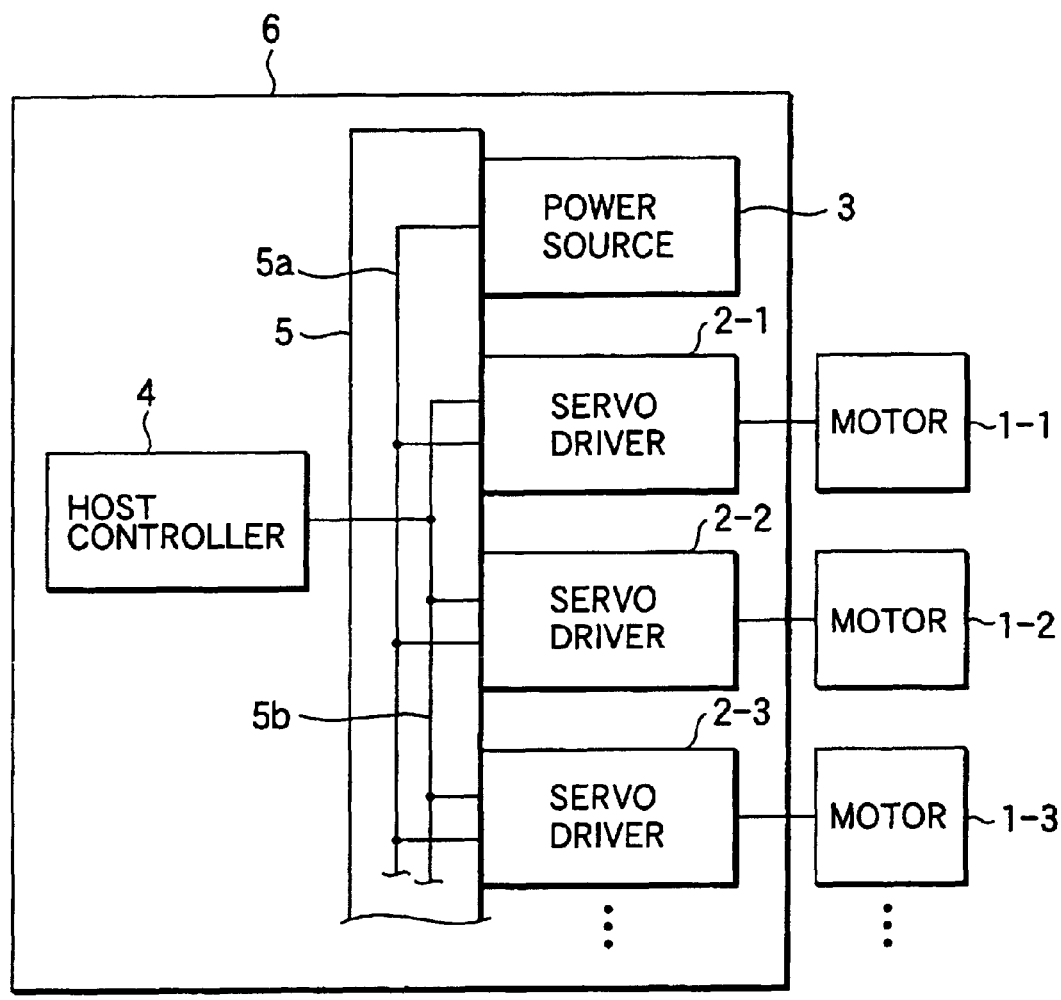
FIG. 8 is the whole connection diagram of a conventional servo control system.
Figure 9:
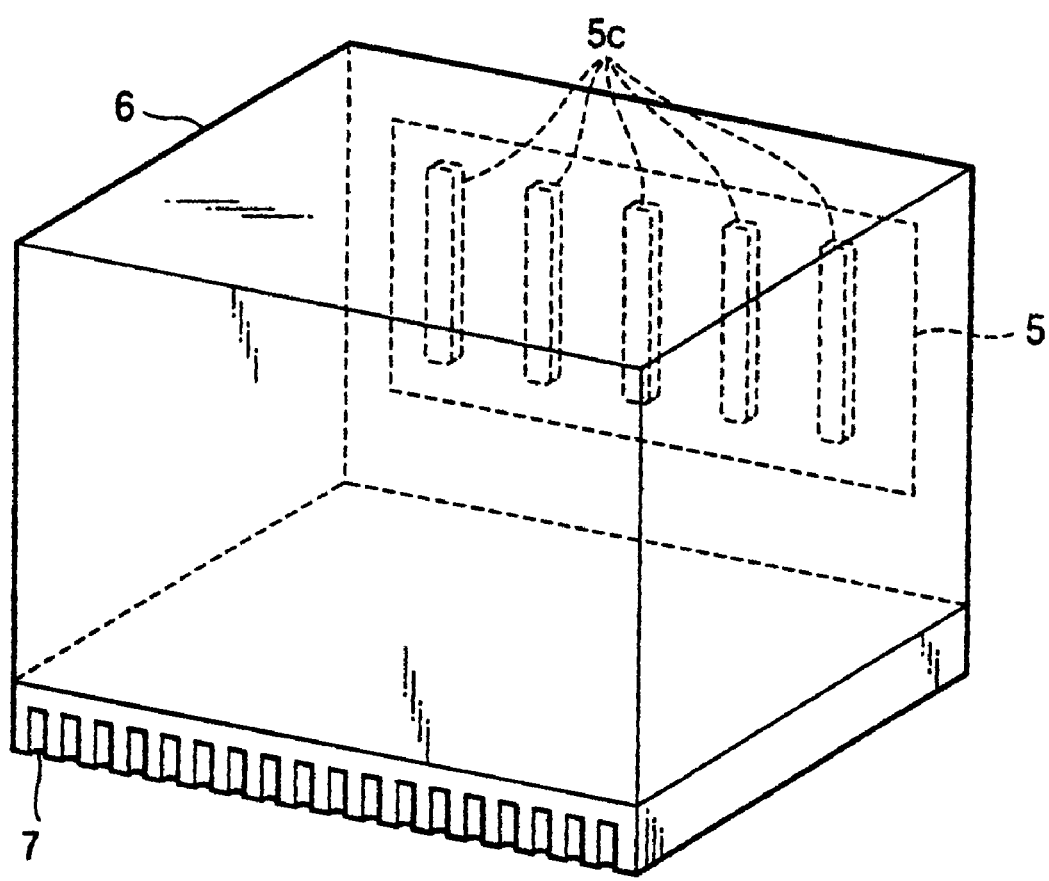
FIG. 9 is a perspective view showing a rack used in the conventional servo control system.

As shown in FIGS. 1 and 4, the drive unit 50 is provided with a printed board 51, and a capacitor 58 stood and provided, a connector 52 acting as a second connection part removably inserted into the connector 85 of the back panel 80, a terminal 62 for detection connected to the detectors 63-1 to 63-4, a motor terminal 64 connected to the motors 61-1 to 61-4, a control part 56 provided between the connector 52 and the terminal 62 for detection, an I/F 60 for detection, an inverter 59 for converting a DC power source into an AC voltage with a predetermined frequency while being provided between the control part 56 and the motor terminal 64, and an ID part 65 acting as identification number generation means for generating identification numbers corresponding to capacitance values $C_1$ to $C_4$ of the capacitor 58 as shown in FIG. 6(a) are fixed in the printed board 51, respectively.

Further, the control part 56 is provided with a two-port RAM 53, a CPU 54 and a motor control part 55.

Here, the capacitor 58 is selected so as to have a predetermined capacitance value necessary to drive the motor 61 of the local shaft.

That is, a capacitance value C (F) satisfying the following expression is selected in order to supply electric power to the motor 61 stably with respect to an instantaneous power failure of predetermined time.

When a rated capacity of the motor 61 driven by the drive unit 50 is set to P (kw), it is necessary to drive the motor 61 by storage energy stored in the capacitor 58 during an instantaneous power failure, so that the following expression holds.

$$(P/\eta)t < (1/2)CV_d^2 \tag{1}$$

A capacitance of the capacitor 58 becomes the following expression by expression (1).

$$C > 2Pt/(\eta V_d^2) \tag{2}$$

where t: instantaneous power failure time (sec), C: capacitance (F) of capacitor, $V_d$ DC bus voltage (V), $\eta$: efficiency of motor etc.

Further, said capacitor 58 is selected so that the following expression holds in order to suppress a rise in temperature of the capacitor 58 to a predetermined value.

$$I_r > I_{ra} \tag{3}$$

where $I_r$ allowable ripple current (A) of capacitor, $I_{ra}$: ripple current (A) at the time of rated load The capacitor unit 70 is used as an add-on portion for storing regenerative electric power incapable of being stored in the capacitors 58-1 to 58-4 of the drive units 50-1 to 50-4, and many kinds of things in which the number of capacitors 72 has a range of one to ten are prepared. As shown in FIG. 5, the capacitor unit 70 is provided with a printed board 71, and in the printed board 71, a plurality of capacitors 72 are connected in parallel and also are stood and fixed, and the input end of the capacitors 72 is connected to a connector 74 acting as a third connection part fixed in the printed board.

Also, the printed board 71 is provided with an ID part 76 for generating an identification number corresponding to all the capacitance values of the capacitors 72 of the capacitor unit 70.

A capacity detection part (detection means) 90 in the centralized control part 46 is formed so as to read out digital signals of the ID parts 65-1 to 65-4, 76 by electrically connecting the capacitor unit 70 and the drive units 50-1 to 50-4 corresponding to motor capacities to the connectors 84, 85-1 to 85-4, 87 of the back panel 80 as shown in FIGS. 6(a) and 6(b).

The voltage detector 95 is formed so as to determine whether or not a voltage of the DC buses P, N exceeds a predetermined reference voltage $V_{dn}$ and also generate a detection signal to an output if the voltage exceeds the reference voltage $V_{dn}$.

A procedure for selecting the capacitor unit in the servo control system constructed as described above will be described by FIGS. 1 to 7. FIG. 7 is a flowchart showing a procedure for determining a capacitance value of a capacitor to be added.

Here, in the case of determining a capacitance value of a capacitor, in a state in which the motors 61 are mounted in a controlled target, namely a state in which the servo control system 100 is installed in the so-called actual machine, the motors 61 are operated according to a run mode in the actual machine in which regenerative electric power is generated largely and a capacitance value (the number) of add-on capacitors 74 of the capacitor unit 70 is determined as follows.

Now, it is assumed that the number of control shafts is three and the number of motors with a capacity of 0.1 (kw) is two and the number of motors with a capacity of 0.4 (kw) is one. First, a regenerative resistor 19 is connected to a resistance terminal 18, and a control unit 40, a capacitor unit 70 having one capacitor, each connector 52 of drive units 50-1 to 50-3 corresponding to capacities of motors are electrically connected to connectors 84, 85-1 to 85-3, 87 of a back panel 80 (step S101), and a capacity detection part 90 reads out output signals from ID parts 65-1 to 65-3, 76 of each the unit 50-1 to 50-3, 76, and a centralized control part 46 calculates the total sum $\Sigma C_n = 2C_1 + C_3 + C_5$ of capacitances of capacitors 58-1 to 58-3, 74 based on said output signals (step S103) and calculates storage energy $W_c$(J) stored in the capacitors 58-1 to 58-3, 74 in a state in which a load is regenerative by the total sum $\Sigma C_n$ of the capacitor capacitances from the following expression (step S105).

$$W_c = 1/2 \cdot \Sigma C_n (V_{dm} - V_{dn}) \tag{4}$$

where $V_{dn}$: DC bus voltage (V) in no load, $V_{dm}$: maximum allowable voltage (V) of DC bus at the time of regeneration A servo control system is operated by a starting command (step S107). That is, a host controller 30 gives a command to the centralized control part 46 through an I/F 42 in the control unit 40, and the centralized control part 46 gives a command to a control part 56 in the drive units 50-1 to 50-3 through a wired bus pattern 80b of the back panel 80, and the control part 56 controls an inverter 59 and drives and controls motors 61-1 to 61-3 while detecting an angle of rotation of the motors 61-1 to 61-3 by detectors 63-1 to 63-3.

Also, a diode stack 14 converts an AC power source 10 into a DC voltage, and this DC voltage is supplied to each the drive units 50-1 to 50-3 and the capacitor unit 70 through the connectors 84, 85-1 to 85-3, 87 via a power pattern 80p of the back panel 80.

When the motors 61-1 to 61-3 proceed to a regenerative mode by a load, electric power is stored in the capacitors 58-1 to 58-3, 74 through the inverter 59 and thereby a voltage of DC buses P, N increases and a voltage detector 95 detects said voltage value (step S109).

The voltage detector 95 determines whether or not a DC bus voltage $V_d$ detected is higher than a predetermined reference voltage value $V_{dn}$ (step S111) and if the DC bus voltage $V_d$>the voltage value $V_{dn}$, the voltage detector 95 generates a signal and the centralized control part 46 switches a regenerative transistor 16 until it becomes the voltage value $V_{dn}$ and thereby the voltage $V_d$ of the DC buses P, N decreases (step S113) and it is determined whether or not the voltage $V_d$ of the DC buses P, N detected by the voltage detector 95 is lower than or equal to the reference voltage value $V_{dn}$ (step S115) and if so, the regenerative transistor 16 is turned off (step S117), and consumption energy (J) by the regenerative resistor 18 is calculated by the following expression (step S119).

$$W_e = V_{dn}^2 \Sigma T_{on}/R \qquad (5)$$

where $V_{dn}$: switching start voltage in DC bus (V), $\Sigma T_{on}$: total sum of switching time of regenerative transistor (sec), R: resistance value of regenerative resistor (Ω)

Next, the centralized control part 46 determines whether or not the consumption energy $W_e$ exceeds the storage energy $W_c$ (step S121) and if so, a capacitance of a capacitor $C_x$(F) to be added is calculated and obtained by the following expression (step S123).

$$W_x = W_c - W_e = 1/2 \cdot C_x (V_{dm} - V_{dn}) \qquad (6)$$

$$C_x = 2W_x/(V_{dm} - V_{dn})^2$$

where $W_x$: capacitor storage energy running short (J)

A capacitance $C_x$ of this add-on capacitor 74 to be added is indicated on an display unit 35 through an I/F 44. By this indication, a capacitor unit 70 in which the number of add-on capacitors 74 is large is mounted in the back panel 80 and the regenerative resistor 19 is removed.

Incidentally, when the add-on capacitor 74 cannot be added, the regenerative resistor 19 having a capacity equivalent to the capacitor storage energy running short is mounted in the terminal 18.

In this manner, after the capacitor unit 70 of the servo control system 100 is selected, the servo control system 100 is operated.

As described above, each the drive unit 50 has the capacitor 58 necessary in the local shaft, and a capacitance value of the necessary capacitor 58 is interlocked and increased or decreased with an increase or decrease in the drive units 50 corresponding to the motors 52, and the capacitor unit 70 having a proper capacitance value can be added properly.

Also, since the total capacitance value of the capacitors 58, 74 is indicated on the display unit 35 whether the total capacitance value is a valid value, even when regenerative. energy is over, mounting the capacitor unit 70 having a proper number of add-on capacitors 74 in the back panel 80 will suffice. Thus, the regenerative energy can be used effectively.

In addition, when the regenerative energy cannot be stored by the capacitor unit 70, the regenerative energy can also be consumed by the regenerative resistor 19.

According to this invention as described above, since a capacitance value of a capacitor connected to a DC voltage conversion part is maintained at a proper value even when a rated capacity of a motor increases or the number of motors increases with an increase in controlled targets, regenerative energy generated from the motor can be properly stored in the capacitor, so that it is desirable from the viewpoint of effective use of the energy and there is an effect capable of selecting the capacitance value of the capacitor suitable for a servo control system.

According to another invention, even when regenerative energy supplied from a load becomes large, said regenerative energy can be stored by an add-on capacitor of a capacitor unit, so that there is an effect capable of making effective use of the regenerative energy more.

According to other invention, consumption energy in which the regenerative energy generated from the motor is consumed by a resistor is compared with storage energy capable of being stored in the capacitor, so that there is an effect capable of determining whether or not the regenerative energy can be stored by the capacitor mounted in the servo control system.

According to other invention, a capacitance value of an add-on capacitor to be added becomes clear, so that there is an effect of facilitating selection etc. of the capacitor unit.

Industrial Applicability

As described above, a servo control system according to this invention is suitable for use in things providing plural motors in which multiple shafts are set as controlled targets.

What is claimed is:

1. A servo control system comprising:
   a plurality of motors for driving a plurality of controlled targets;
   a plurality of drive units having a first connection part, for driving the motors;
   a control unit having a second connection part, for receiving a command from a host controller and sending a command to the drive unit;
   a rack including a back panel having a connected part for removably electrically connecting to the first and second connection parts, the rack accommodating the control unit and the drive unit; and
   a DC voltage conversion part for converting an AC voltage as an input into a DC voltage as an output, the DC voltage conversion part disposed in the back panel, wherein the drive unit has:
   a capacitor having a predetermined capacitance value determined based on a rated capacity of the motor driven by the drive unit and connected in parallel with an output of the DC voltage conversion part; and
   an inverter part for converting a DC voltage into an AC voltage based on a command; and
   the capacitor has a capacitance value in which an allowable ripple current is larger than a ripple current flowing through the capacitor at a time of a rated load of the motor and electric power is supplied to the motor with respect to an instantaneous power failure of predetermined of the AC voltage.

2. The servo control system according to claim 1, further comprising a capacitor unit having an add-on capacitor connected in parallel with the capacitor and having a third connection part removably electrically connected to the connected part of the back panel.

3. A servo control system comprising:
   a plurality of motors for driving a plurality of controlled targets;
   a drive unit having a first connection part, for driving the motors;

a control unit having a second connection part, for receiving a command from a host controller and sending a command to the drive unit;

a rack including a back panel having a connected part for removably electrically connecting to the first and second connection parts, the rack accommodating the control unit and the drive unit;

a DC voltage conversion part for converting an AC voltage as an input into a DC voltage as an output, the DC voltage conversion part disposed in the back panel;

voltage detection means for generating a signal when a DC voltage value of the DC voltage conversion part reaches a predetermined value;

switching means connected to an output of the DC voltage conversion part through a resistor, the switching means for performing on-off control based on the presence or absence of a signal from the voltage detection means;

first calculation means for calculating consumption energy consumed in the resistor based on the on time of the switching means and the DC voltage value;

second calculation means for calculating storage energy stored in the capacitor and the add-on capacitor based on a predetermined voltage rise value of the DC voltage of the DC voltage conversion part and a capacitance value of the total sum of the capacitor and the add-on capacitor and for comparing a value of the consumption energy with a value of the storage energy; and display means for displaying a result of the comparison means, wherein the dive unit has:

a capacitor having a predetermined capacitance value determined based on a rated capacity of the motor driven by the drive unit and connected in parallel with an out put of the DC voltage conversion part; and an inverter part for converting a DC voltage into an AC voltage based on a command.

4. The servo control system according to claim 3, further comprising:

a capacitor unit having an add-on capacitor connected in parallel with the capacitor and having a third connection part removably electrically connected to the connected part of the back panel;

third calculation means calculating storage energy stored in the capacitor and the add-on capacitor based on a predetermined voltage rise value of the DC voltage of the DC voltage conversion part and a capacitance value of the total sum of the capacitor and the add-on capacitor and for comparing a value of the consumption energy with a value of the storage energy, in place of the second calculation means; and display means for displaying the capacitance value.

5. The servo control system according to claim 3, further comprising:

identification number generation means for detecting that the first connection part of the drive unit and the third connection part of the capacitor unit are electrically connected to the connected part and for generating identification numbers associated with capacitance values of the capacitors provided in the drive unit and the capacitor unit;

detection means for detecting an identification number of the identification number generation means;

fourth calculation means calculating the total sum of capacitance values of the capacitor and the add-on capacitor from the identification number of the detection means and for calculating the storage energy value running short and calculating a capacitance value of a capacitor to be added when the consumption energy value obtained by the first calculation means is higher; and display means for displaying the capacitance value.

\* \* \* \* \*